Jan. 23, 1934. G. L. COLBIE 1,944,493
APPARATUS FOR CONTROLLING THE POSITION OF STAPLES IN WIREBOUND BOXES
Filed April 23, 1932 6 Sheets-Sheet 1
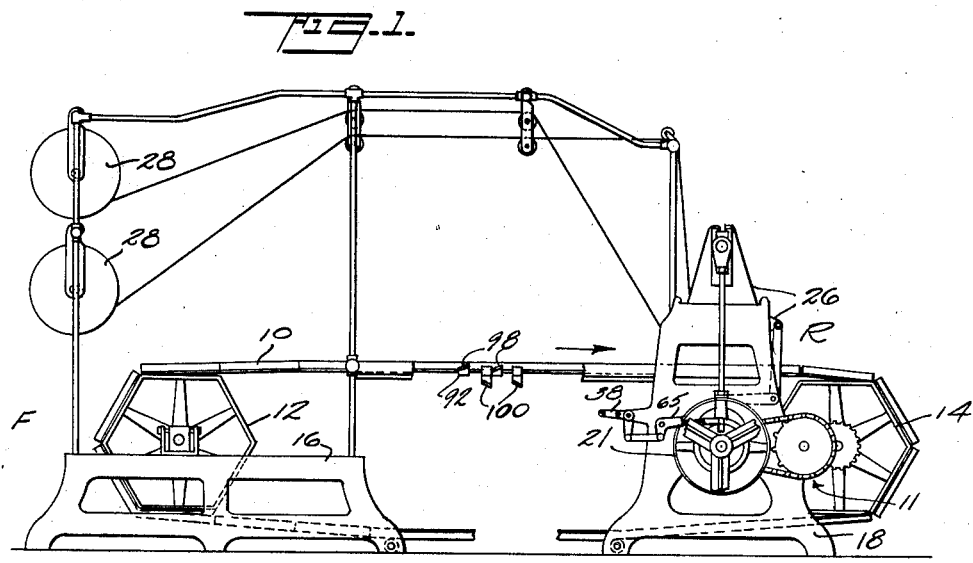
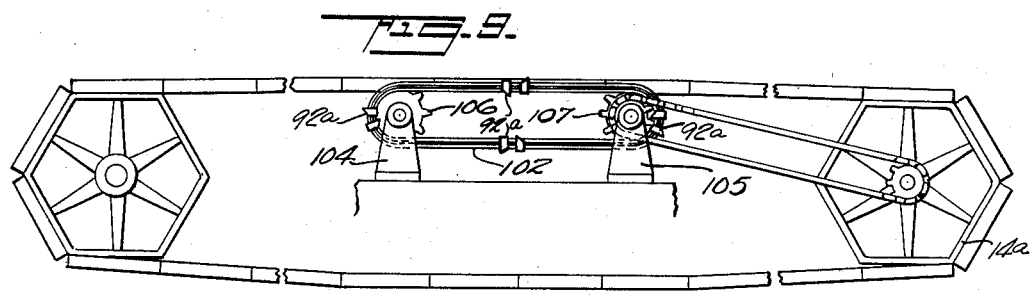
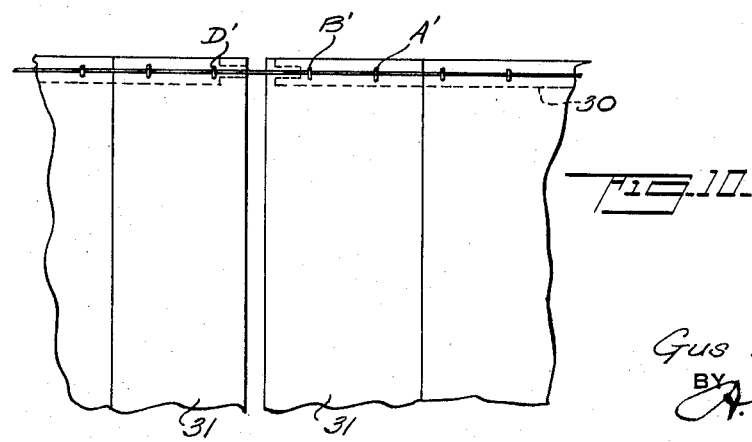
INVENTOR
Gus L. Colbie
BY
A. Parkerhmith
ATTORNEY Jan. 23, 1934.  G. L. COLBIE  1,944,493
APPARATUS FOR CONTROLLING THE POSITION OF STAPLES IN WIREBOUND BOXES
Filed April 23, 1932  6 Sheets-Sheet 2
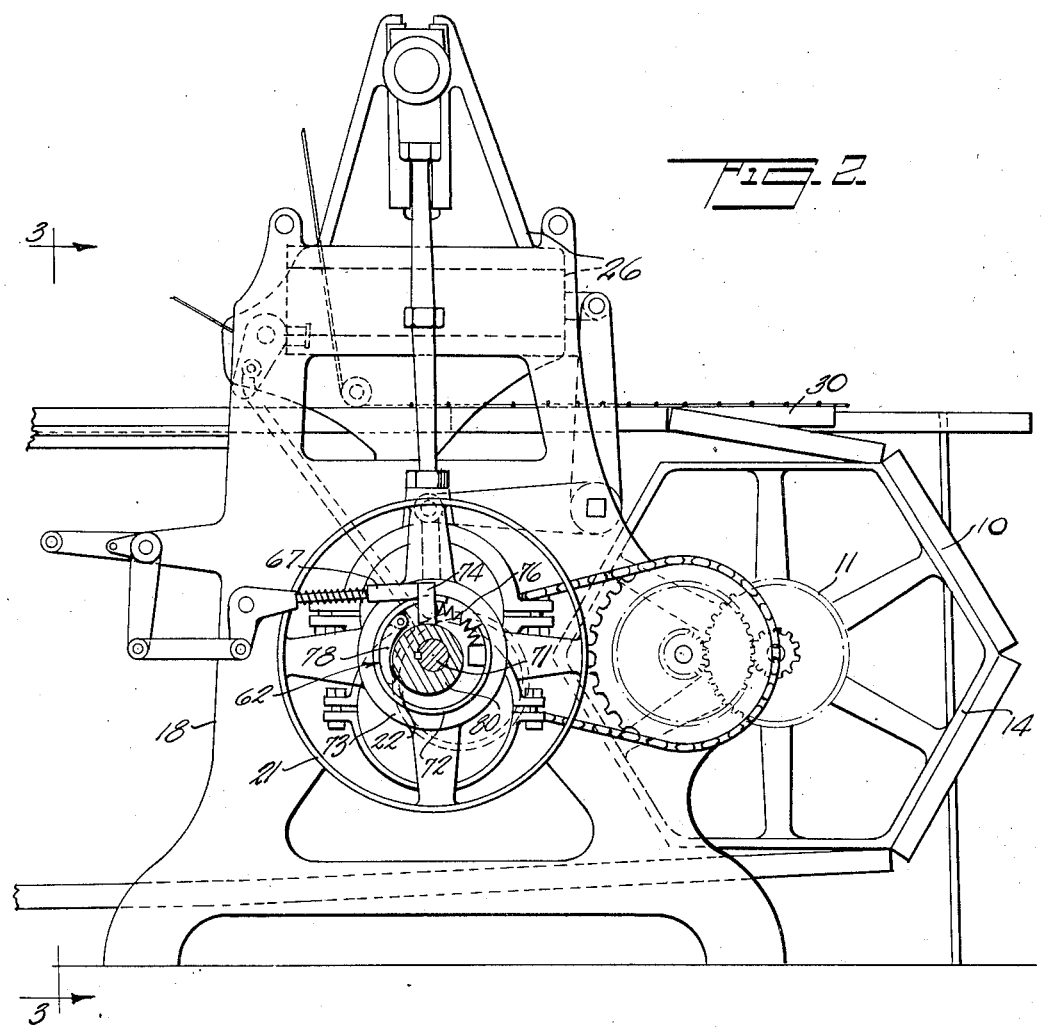
INVENTOR
Gus L. Colbie
BY
A. Parker Smith
ATTORNEY

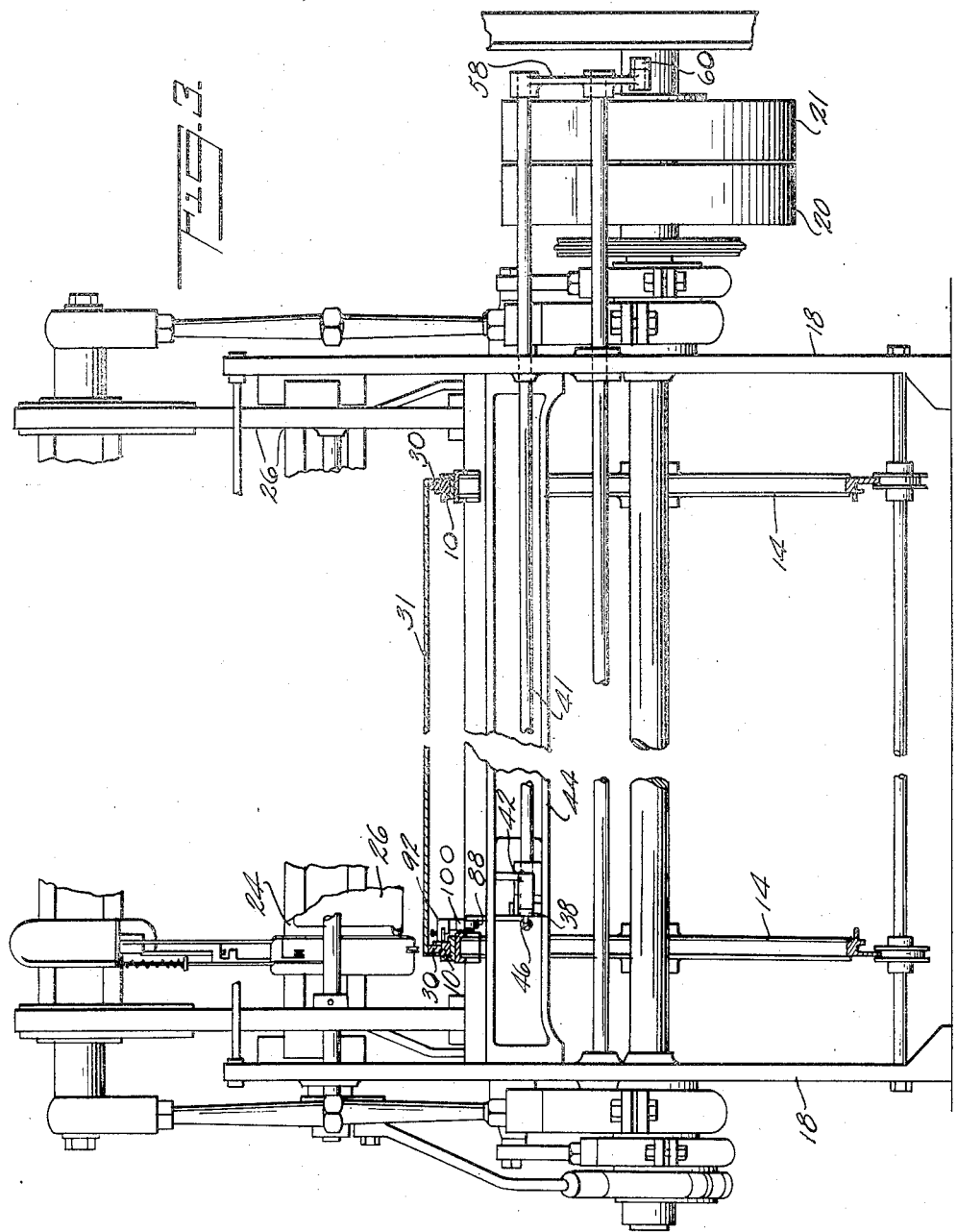

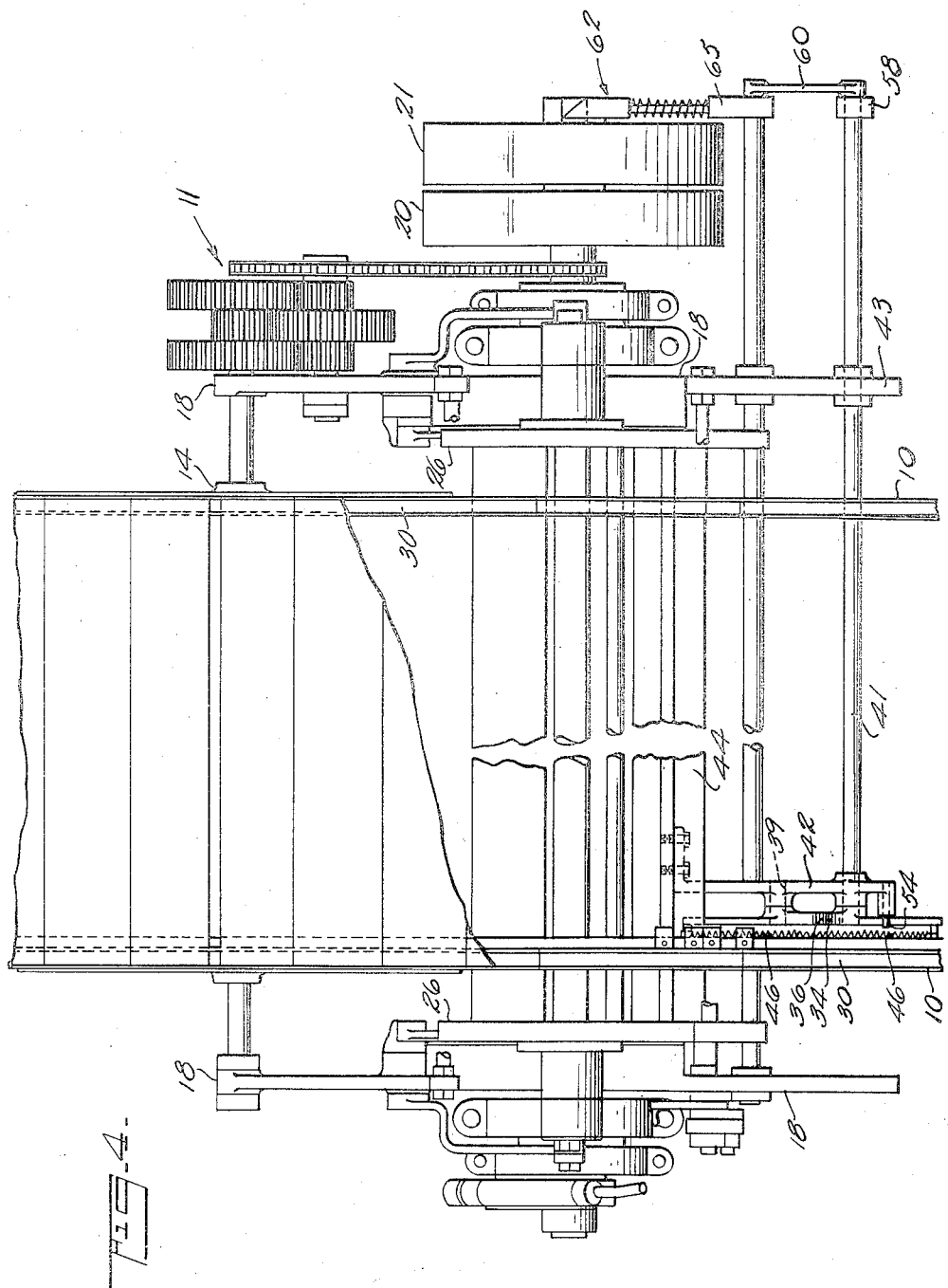

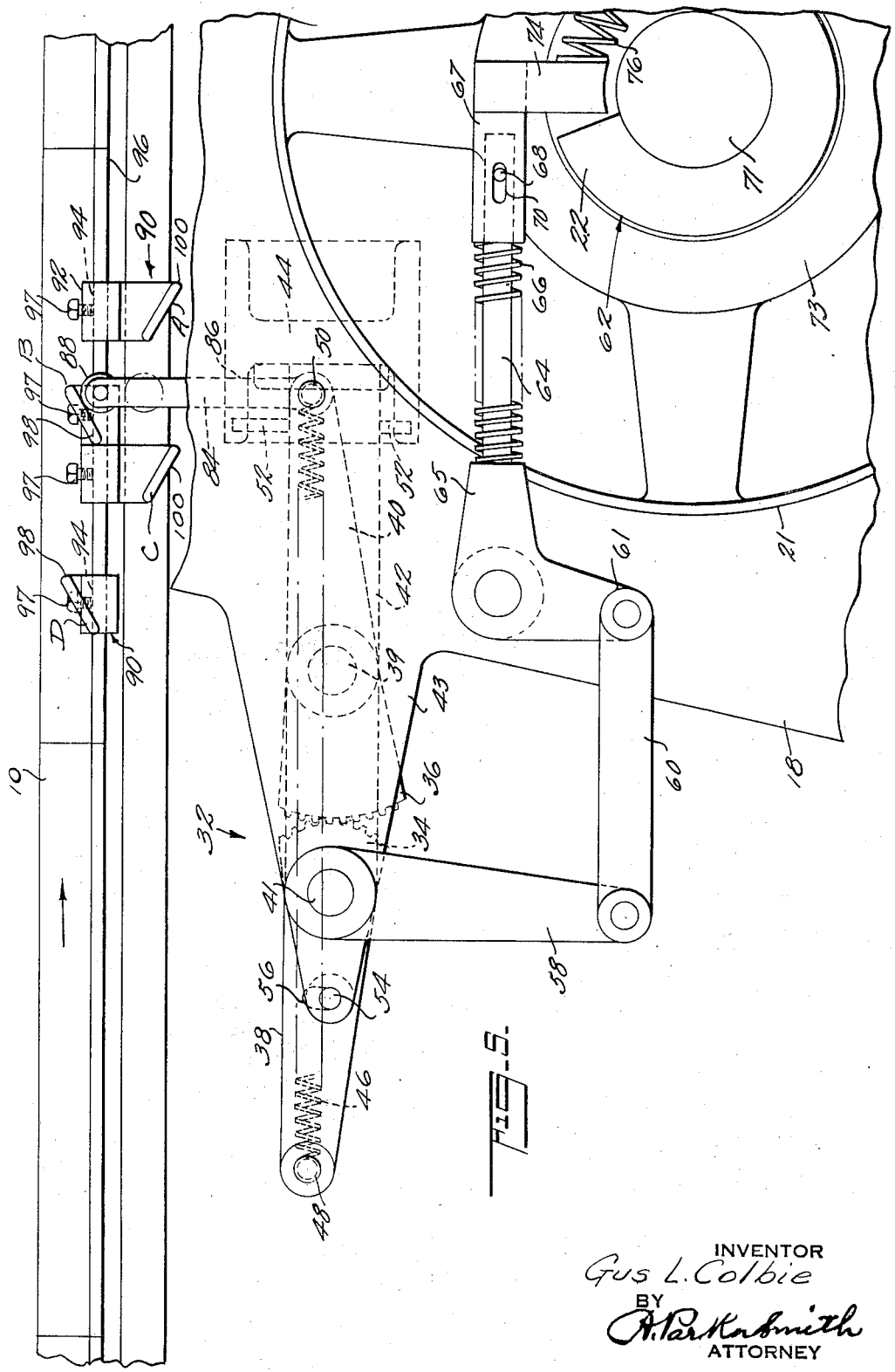

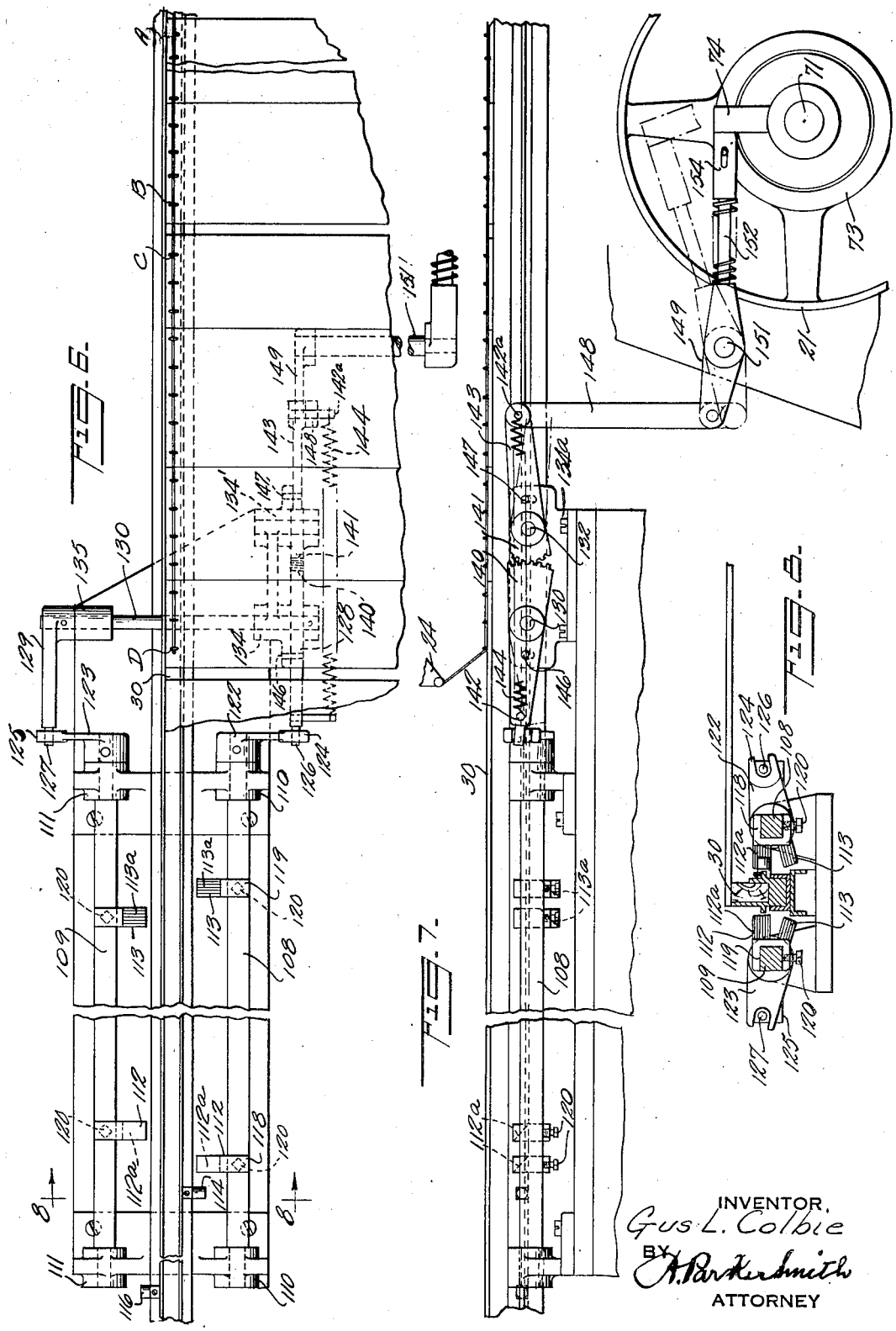

Patented Jan. 23, 1934

1,944,493

UNITED STATES PATENT OFFICE 1,944,493

APPARATUS FOR CONTROLLING THE POSITION OF STAPLES IN WIREBOUND BOXES

Gus L. Colbie, Brooklyn, N. Y., assignor to F. MacGovern Corporation, New York, N. Y., a corporation of New York Application April 23, 1932. Serial No. 607,100

8 Claims. (Cl. 1—8.2)

This invention relates to a machine for use in constructing boxes or crates, particularly those made up from blank forms held together by binding wires, and presents an improved method and apparatus for controlling the location of certain fasteners usually employed to affix the wires to the several panels of each blank.

According to the present practice, as disclosed for instance in Thompson Patents Nos. 1,595,033, 1,669,383 and 1,738,806, box or crate blanks are fabricated by placing sheets or strips of veneer over cleats, all of which parts are continuously movable along the bed of the machine by means of endless chains. Fasteners, in the form of staples are then driven over binding wires through the veneer and into the cleats, to secure the veneer to said cleats and to join a plurality of panels together, all this being done while the work is being carried along by the chains.

Generally speaking the staples on each blank panel may be uniformly spaced apart, but it is always desirable to accurately locate the first and last staple in each panel with reference to the edges thereof, and there are cases in which the intermediate staples must be in accurate locations in the panels.

In the type of construction shown in the above mentioned patents, the fastener setting mechanism is normally inactive and is separately energized or actuated, each time a staple is driven. This is done by throwing into operation a clutch mechanism which thereupon connects said fastener setting mechanism with a continuously driven power member. The continuous engagement and disengagement of the clutch for each staple driven produce numerous constantly recurrent shocks in the machine, which tend to crystallize the metal parts, loosen fastenings and necessitate frequent repair and replacement of the clutch parts as the result of excessive wear.

More recently it has been proposed to have the staple fastening mechanism normally in action setting staples at a uniform distance apart, and then to temporarily hold it out of action whenever a wider spacing is desired, but the devices heretofore proposed for this purpose have been cumbersome and complicated in construction and slow in action, or they have been electrically operated. The latter procedure involves a continual recurrence of spark production, which is dangerous in a box factory. The main object of the present invention is to produce a simple, inexpensive and positively acting mechanical device for automatically throwing the staple setting mechanism quickly out of action, and then quickly back again into action at predetermined periods while the panels of veneer, or like material, are being continuously moved forward through the staple-setting zone, the control devices for this purpose containing only the irreducible minimum of parts and joints.

The best form of apparatus at present known to me embodying my invention, and certain modifications, are shown in the accompanying six sheets of drawings, in which Fig. 1 is a side elevation of a wire bound box and crate blank making machine embodying the invention, with parts broken away.

Fig. 2 is an enlarged side elevation of the operating and delivery end of the machine.

Fig. 3 is a transverse section through the work carrying chains and an elevation of the operating end of the machine looking in the direction of arrows 3—3 on Fig. 2.

Fig. 4 is a plan view of the operating end of the machine with parts broken away.

Fig. 5 is a further detail enlargement in side elevation of the essential parts involving this invention, including also a section of the endless work conveyor chain with a series of operating lugs adjusted thereon so as to produce a spacing distance between two consecutive staples greater than the standard or uniform spacing. This is technically called "a pattern."

Fig. 6 is a plan, with parts broken away, showing a modified form of staple-setting control-mechanism in which a stationary pattern bar is used in place of a pattern travelling on the endless chain.

Fig. 7 is a side elevation of the particular structure shown in Fig. 6.

Fig. 8 is a cross section taken on the lines 8—8 of Fig. 6.

Fig. 9 is a fragmentary elevational view showing a modified form of pattern chain, and Fig. 10 is a fragmentary plan view of part of a box blank with the remainder broken away.

Throughout the drawings, like reference characters indicate like parts. Referring to Fig. 1, the general machine structure shown in the drawings is that of a standard type of machine used to produce wire bound box or crate blanks and generally comprises a pair of continuously driven endless work feed chains 10 carried by sprocket wheels 12 and 14, said sprocket wheels being journaled on frame members 16—18, one at each end of the machine. The forward or work supply end of the machine is generally designated by F and the rearward or operating end by R.

At the operating end, the principal parts there located comprise the power drive pulley 20 (see Fig. 3) which is geared directly to the feed chains 10 by means of chain drive and speed reducing gear mechanism 11 of usual type. Pulley 20 is indirectly connected, through a clutch member 22 (Fig. 2) located within an idler pulley 21, to a staple forming and driving, or fastener setting, mechanism 24 (partly shown in Fig. 3), and also to mechanism for reciprocating a carriage 26 which synchronizes the movement of the fastener setting mechanism with the movement of the work (the box panels and cleats) carried on chains 10, such synchronization being established during the short time in which a staple is being driven.

Rolls of staple and binding wire 28 are supported on a skeleton frame structure above the machine as indicated in Fig. 1, and the wires are led over guide pulleys to and beneath the fastener setting mechanism, where they are secured to the panels of veneer by the staples, for the purpose of binding the panels together and thus forming the box blanks.

To operate the above described machine, box cleats 30 (best shown in Fig. 3) are first placed in the channels of the moving feed chains 10, and strips of veneer 31, 31 (Figs. 3 and 10) or like material are placed upon and over the cleats before the assembly so formed reaches the fastener setting mechanism. Upon reaching said fastener setting mechanism, staples are formed therein and driven over and around the binding wires, and through the panels of veneer and into the cleats, thus securing the veneer strips to the cleats, and also binding the panels of each blank together.

The practice heretofore followed has been to control the location of each staple by means of a pattern made up with lugs set at various distances apart, the minimum distance of which is limited by the speed of the work feed chain in relation to the throw of the staple driving mechanism, thus limiting the setting to certain fixed minimum or standard distances, but offering no limitation as to distances greater than said minimum distance. The fastener setting mechanism is normally inactive and is adapted to become active each time a staple is driven.

According to this invention, the principle of operation is the reverse of that just above referred to, that is, the fastener setting mechanism is normally active, and being so, automatically drives a predetermined number of staples an equal distance apart until its operations are interrupted. When it is desired to vary the spacing between two successive staples, this is accomplished by discontinuing the operation of the fastener setting mechanism for a brief period, to permit the work to advance thereunder a distance greater than the uniform spacing distance automatically produced, and then resuming said regular uniform staple setting procedure by throwing the operating clutch back into engagement.

To accomplish these results, it is desirable to employ a mechanism for positively engaging or disengaging such clutch with a quick snap action, in either direction, and to provide means for tripping said mechanism, in both directions, so as to quickly disengage, and thereafter quickly re-engage the clutch. Referring to Fig. 5, the tripping mechanism involves an off-center, spring-operated device 32, which comprises two segmental or sector gears 34, 36, each having a lever arm 38, and 40, respectively, projecting outward therefrom from their sector journals, preferably opposite each segment end. One of said segments 36 is mounted on a stud 39 secured within a bracket 42, which bracket is secured to a transverse cross bar 44 used to tie the sides of the main frame members 18 together. The other of said segments 34 is secured to one end of a shaft 41 supported at one end within the bracket 42, and extending transversely across the machine and supported near its other end within a wing 43, projecting from the main frame member 18. A tension spring 46 is stretched between, and secured to, pins 48—50, on the ends of the arms 38 and 40 respectively, which spring will draw the lever above or below a median line drawn through the segment pivot axes and/or journals, depending upon whichever direction the resulting arrangement of the sectors of said arms are forced to swing. As illustrated, one of the segments 36 has a larger pitch diameter or radius than the other. Therefore, a movement applied to the segment with the longer pitch radius will cause the smaller one to move a greater angular distance, and thus to move that end of the spring beyond the axial median line more quickly than if both segments were the same pitch diameter. The movement of the segment levers is limited in each direction by means of stops which may comprise pins 52 secured in the cross bar 44, Fig. 5, for segment lever 40 and a pin 54 extending outward from the end of the segment supporting bracket 42, which engages a slot 56 in the segment arm 38.

A lever 58 is secured to that end of the shaft 41 opposite the end to which the gear segment 34 is attached, and is joined by a link 60 to one end of a bell crank 61. A rod 64 projects outward from the other end 65 of said bell crank 61 and has a stop member, comprising a sliding shoe 67, secured on its free end. Said shoe is normally forced outward away from the bell crank axis by means of a compression spring 66, coiled around the rod 64, its movements being limited by a pin 68 in said rod 64, projecting into a slot 70 in said shoe.

The clutch used to join the continuously driven pulley 20, with a main or fastener setting mechanism operating shaft 71, may be of any suitable type, but preferably is of the pin-type having definite position characteristics, which can be actuated by means of a stop member, such as last above described, and indicated generally by the reference character 62, or by any other suitable means. The form of clutch proper here shown comprises a split ring 72, (Fig. 2) which is adapted to fit within a recess in the hub 73 of the idler pulley 21, which pulley is adapted to rotate freely around said hub, when and while the shoe 67 is in engagement with an ear 74, secured to said ring 72. When the stop member is raised out of engagement with the ear 74, a spring 76 (Fig. 2) spreads apart the free ends of said split ring 72, causing it to be locked in frictional driving engagement with the hub 73 of the pulley 20. A wedge 78, joined to said ring, moves with it at the proper time and wedges itself against an eccentric 80, keyed to the main drive shaft 71, to which shaft the fastener setting and carriage operating mechanism are geared. The fastener setting mechanism is then set in motion and continues in operation until the stop member 67 is lowered and again brought into engagement with the ear 74, whereupon the split ring is released and contracts by its elasticity so as to eliminate frictional contact with the hub 73, which then is again permitted to freely pass over it.

The movements of the stop member 67 into and out of the path of the ear 74 are controlled by the movement of the gear segments 38—40, and their movements are controlled by the actuation of a vertically disposed rod 84 (Fig. 4) secured at the end of the arm 40 and guided in an opening 86 in the cross bar 44, so as to have endwise movement only. A cam roller 88 is mounted at the upper end of the rod 84 and so located as to normally rest in the path of cam lugs 98, which may be clamped to one of the work feed chains 10.

Two sets of cam lugs 90 are provided, each of which lugs comprises a block 92 having a slot 94 in one face thereof adapted to fit over a flange 96 formed on the chain 10. On the other face of each of one set of cam lugs, there is an angularly disposed cam flange portion 98 projecting outward from the upper portion of the block 92 and arranged so as to strike and force the cam roller 88 on bar 84 downward when the travel of chain 10 brings it against said roller, while on each one of the other set of cam lugs, there is a similar cam flange portion 100 (but of reversed inclination) projecting outward from the lower portion of the block at a level such as to cause it to strike the under side of cam roller 88 and force it upward back to its normal position. These cam lugs 90 may be adjusted to any desired position along the flange 96 and are fastened to said flange by set screws 97, so as to trip the off-center spring operated mechanism before described at predetermined intervals and thereby operate the clutch, to engaged or disengaged positions.

As shown in Fig. 5, the cam lugs are arranged so that the one indicated at A will cause the clutch to become disengaged after the staple indicated at A' (Fig. 10) has been driven into a panel due to the engagement of the cam flange 100 with the roller 88, which moves the rod 84 upward and rocks the gear sector or segments until the spring passes below the axes of said sectors, whereupon the strained action of the spring 46 causes bell crank 61 and shoe 67 to quickly swing through the rest of its oscillating movement and into a position such that clutch ear 74 strikes said shoe 67 at the completion of the current revolution and so cause disengagement of the clutch, thus discontinuing the operation of the fastener setting mechanism temporarily while the work continues to move thereunder. The next cam flange B then approaches the cam roller 88, striking and forcing said roller and the bar 84 which carries it downward, to reverse the swinging movements of the segments 34, 36 and so throw the shoe 67 out of engagement with the ear 74, which thereupon allows the clutch to become engaged with the driving pulley 20 and permits the drive shaft 71 to resume operation of the fastener setting mechanism and drive the last staple B' in the panel. Immediately after the roller 88 passes the cam flange B, it again encounters another cam flange C which opens the clutch in the manner described with reference to cam A, thus discontinuing the actuation of the fastener setting mechanism again to permit a sufficient interval of time to elapse before the driving of the next staple D' is accomplished, the latter being the first staple in the next succeeding panel. The cam flange D will next trip the off-center spring mechanism and cause engagement of the clutch again in the same manner as did cam flange B.

Four cams are required when the spacing between staples in any one panel is such that the last staple to be driven would not come at the required distance from the end of said panel, but when the spaces between staples is such that the last staple location will be within the required distance, only two cams will be required to provide for the space between the last staple in one panel, and the first in the next panel.

When the staples between the first and last in each panel are in evenly spaced relation as in the latter case referred to above, cam lugs would then only be required for the placement of staples at the box corners, but it is to be understood that any number of cam lugs may be used for varied requirements.

The cam lugs, as described are adapted to be placed at the required positions along the endless chain 10, which chain is of sufficient length to take care of a plurality of sets of panels for box blanks, but a separate control chain may be used if desired, which is only of a length sufficient to take care of one set of panels, making up a single box blank, as for instance a chain of the type shown in Fig. 9 at 102. This chain is preferably of the endless type and of a length approximately equal to that of the blank to be formed on the machine. Bearings 104—105 are provided which support the chain carrying sprocket wheels 106—107, one of which is driven through a chain and sprocket gearing connected to the shaft of one of the main work-feed chain sprocket wheels 14$^a$. Four sets of cam lugs 92$^a$ are shown for locating the staples at the box corners in their desired positions. The use of this chain therefore decreases the extent of preparatory setting-up operations which have to be performed with the previously described arrangement, in which the cam lugs were placed on the work-feed chain.

A still further modified form of apparatus is illustrated in Figs. 6, 7 and 8. This form comprises a pair of pattern bars 108—109 preferably of square cross section, the ends of which are machined to form journals on which these pattern bars may rotate within bearings 110, 111, in which they are mounted. The bars 108—109 are arranged parallel to one another, one on each side of one of the workfeed chains 10, and have adjustable cam lugs 112—113 mounted thereon, which are so placed as to be engaged by adjustable pins 114—116 secured to opposite sides of the said moving chain 10.

The lugs 112 have cam shaped portions 112$^a$, the faces of which are downwardly disposed, while the lugs 113 have cam shaped portions 113$^a$ with upwardly disposed faces. Said lugs are secured to the bars 108 and 109 by placing the forked ends 118—119 on each respectively, over the said bars and securing these in place by set screws 120.

On the rearward ends of each bar 108 and 109, I mount a lever 122 or 123, each of which has a yoked end 124 and 125 adapted to engage the projecting end 126 or 127 of a sector lever 128, or crank 129. The lever 128 is one of two sector or segment levers used in connection with an off-center spring operated mechanism similar to that previously described. Said mechanism comprises segmental gears 140—141, the one, 140, of which has the lever arm 128 projecting outwardly therefrom, and the other 141 having a similar lever arm 142 projecting outwardly therefrom. Segmental gear 140 is mounted on a shaft 130 which shaft has one end mounted in a bearing 134 and its other end mounted in a bearing 135, while the segmental gear 142 is mounted on a stub shaft 132 which shaft is mounted in a bearing 134', said bearings 134—134' forming part of a bracket 134$^a$.

A spring 144 is stretched between pins 142—142ᵃ on the ends of said arms 128 and 143, and the movements of said arms are limited by pins 146 or 147 fixed thereon and engaging slots in the bracket 121. A link 148 joins the end of segment lever 143 to a lever 149 mounted on one end of a transverse shaft 151. On the other end of said shaft 151, is mounted the clutch lever, which comprises a rod 152 projecting outward therefrom with a spring impressed shoe 154 mounted on the free end of said rod, thus providing a clutch tripping arm which is adapted to function in the same manner as did the previously described clutch tripping arm and shoe shown in Fig. 5 the gear segment 141, having a shorter pitch line radius than has segment 140, an increased rapidity and amplitude of movement of clutch-tripping shoe 154 results from a given movement of pattern bar 122 or 123.

The crank 129 has no segment like 140, forming part of it, but is pinned to the other end of shaft 130, upon which the segment member 140 is mounted and pinned. Therefore, any movement imparted to either crank arm 128 or 129, will actuate the toothed segments 140—141.

When the cam lugs 112—113 are placed as shown in Fig. 6, the pin 114, while moving with the chain 10, will first engage the inner cam lug 112, and rock it upward about the pivotal axis of the bar 108, thereby also swinging the lever 122 and segment gears 140, 141, so as to lift the shoe 154 out of engagement with the ear 74, and thus permit the clutch to automatically become engaged with the driving pulley 20, and start the staple driving mechanism into operation, by transmitting thereto the motion of the main operating shaft 71, all as previously described. The first staple "A" (Fig. 6) will then be driven in the first panel and each succeeding staple thereafter will be driven in at equally spaced distances until the last staple "B" in said blank has been driven. After the last staple "B" is driven, the pin 114 will engage the cam lug 113, forcing it downward and thereby also rocking the bar 108 downward about its pivot, back into its original position. This will actuate the off-center spring mechanism and cooperating clutch trip to open the clutch and allow the staple driving mechanism to cease functioning until the work has moved up to the position in which the first staple "C" in the next panel is to be driven into it.

The first and third panels in a box blank will always be equal in dimension (they forming the box sides) as will the second and fourth panels (which form the box top and bottom), but one pair of panels will usually be different in dimension from the other pair. If such is the case, it is obviously necessary to provide a pattern bar for each pair of panels.

After the last staple "B" has been driven in the first panel, as above described, a pin 116 on the outer side of the chain 10, will move into engagement with the cam lug 112 on the bar 109, and will rock said bar about its pivot and thereby swing the lever 123 so as to impart motion in a downward direction to the crank arm 129. Since this crank 129 is pinned to the segment shaft 130, segments of the off-center spring operated mechanism and cooperating parts will cause the staple driving mechanism to again start functioning and drive the first staple "C" and succeeding equally spaced apart staples in the second blank. When the last staple "D" has been driven in this second blank, the pin 116 will have engaged the cam lug 113 on bar 109 and the clutch will be opened, and the staple setting apparatus will rest until the same operations are repeated for the next following panel.

While the pattern illustrated shows only the necessary lugs for skipping a joint, i. e., the space between succeeding panels, it is to be understood that any number of lugs may be used to specifically locate and drive any other staples which for any reason must have a different position from the uniform spacing.

Less lugs are required for the pattern bar structure than either of the other pattern structures of the endless chain type. Its use, therefore, simplifies the setting of the pattern. With both this form of structure and those using a chain, the setting of a pattern requires less time than does the setting of a pattern in accordance with the present practice in which the clutch is tripped for every staple.

Due to the described improvements involved in the various forms of structure here shown, much time will be saved in setting up a machine for a run of blanks, and since the number of operations of the clutch for each blank has been reduced, the clutch parts and associated mechanisms will last longer, thereby reducing wear and tear and the cost of repairs or replacement of parts.

I am aware that pattern bars have been used heretofore instead of spacing a series of lugs along the work chain in pattern producing relation, but prior pattern bars have had all their cams or cam operating lugs on one side, which has caused a concentration and complication of mechanism, which are avoided where the two bars are used, one for each set of panels and these located on opposite sides of the work chain as shown.

Various changes can be made in the details of construction here shown and described as forming several embodiments of my invention, any such modifications still being within the scope of the invention here claimed, if the principles of operation and results explained are substantially preserved.

The snap-over device hereinbefore described is simple in construction, positive in action, and cheap to manufacture, but other devices of that type, having the same capacity for quickly and automatically completing the clutch opening or closing movement, as soon as it has been forced by the tripping member beyond the critical midpoint of its motion, could be substituted for the particular mechanism here shown.

I claim:

1. In a machine for making wire-bound boxes having a continuously operating work-feeding mechanism, and a cooperating staple-setting mechanism operatively connected to said work-feed mechanism through a power transmission clutch, the combination, with said above described apparatus, of a snap-over control device for opening and closing said clutch, and means comprising an element moving in unison with said work feeding mechanism for tripping said snap-over mechanism; whereby, as soon as said tripping means has come into action to an extent sufficient to carry said snap-over mechanism past its critical point of operation, the latter will automatically and instantly complete the clutch engagement or disengagement then in progress.

2. A combination such as defined in claim 1, in which said means comprises a plurality of cam lugs capable of being mounted on, and in any desired positions along the work-carrying chains.

3. A combination such as defined in claim 1 in which said means comprises a series of flanges projecting one from the side of each of the links of the work-feeding chains in line each with the others, and a plurality of cam lugs each grooved to fit over any of said links and provided with means for clamping it in any position thereon.

4. A combination such as defined in claim 1 in which said means comprises a pattern bar journalled in bearings adjacent a portion of the path of one of said work-feeding chains and extending parallel thereto, cams on said bar, cam rollers pivoted on said chain and adapted to engage said cams when passing them, and an operative connection from said bar to said snap-over device; whereby cam produced oscillation of the bar will actuate said device.

5. A combination such as defined in claim 1 in which said means comprises two pattern bars extending along opposite sides of one of said work-feeding chains, journalled to swing at right angles thereto, and each provided with a plurality of cam lugs extending toward said chain, together with cam rollers pivoted on said chain, said pattern bars being operatively connected to said snap-over device for actuating it independently one of the other.

6. A combination such as defined in claim 1 in which said means comprises an endless pattern chain, sprocket wheels supporting said chain, mechanism for rotating said sprocket wheels synchronously with said work-feeding chain, and cam lugs adjustably mounted on said endless chain and actuating said snapover device.

7. A combination such as defined in claim 1 in which said power transmission clutch comprises a pulley supported by a hub, a revoluble shaft on which said pulley and hub are freely mounted, a split ring inside said hub, an eccentric fast on said shaft within said ring and hub, a wedge member pivoted inside said split ring and extending between it and said eccentric, a spring normally forcing the ends of said split ring apart and into frictional contact with said hub, and a radially projecting ear on one end of said split ring adapted to be engaged by a stop arm adapted to be vibrated quickly into or out of the path of revolution of said ear by said snap-over device; whereby prompt clutch engagement and disengagement are produced.

8. A snap-over device for use as an element in the combination of claim 1, which device comprises two cooperating pivoted gear segments, one of which has a considerably longer pitch line radius than has the other, an actuating connection to the free end of the segment having the longer pitch line radius, a vibrating clutch stop member operatively connected to the free end of the other segment, and a tension spring connecting the free ends of both said segments; whereby, when said spring is moved by the rotation of said segments from one side of the line joining their pivots to the other side thereof, the more rapid movement of the segment having the smaller pitch line radius increases the quickness and positive character of the snap-over action for any given limited movement of said actuating connection.

GUS L. COLBIE.